(12) United States Patent
Choin et al.

(10) Patent No.: US 11,975,703 B1
(45) Date of Patent: May 7, 2024

(54) APPARATUS AND METHOD FOR ELECTRICALLY ASSISTED HYDRAULIC BRAKE

(71) Applicant: Zoox, Inc., Foster City, CA (US)

(72) Inventors: Paul Choin, Pleasanton, CA (US); John J K McCarthy, Foster City, CA (US); Ishan Sharma, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 180 days.

(21) Appl. No.: 17/752,726

(22) Filed: May 24, 2022

(51) Int. Cl.
*B60T 8/1761* (2006.01)
*B60L 7/26* (2006.01)
*B60T 7/22* (2006.01)
*B60T 13/58* (2006.01)

(52) U.S. Cl.
CPC ............ *B60T 8/17616* (2013.01); *B60L 7/26* (2013.01); *B60T 7/22* (2013.01); *B60T 13/58* (2013.01); *B60T 2210/10* (2013.01); *B60T 2210/32* (2013.01); *B60T 2270/10* (2013.01); *B60T 2270/602* (2013.01)

(58) Field of Classification Search
CPC ........ B60T 8/17616; B60T 7/22; B60T 13/58; B60T 2210/10; B60T 2210/32; B60T 2270/10; B60T 2270/602; B60L 7/26
See application file for complete search history.

(56) References Cited

U.S. PATENT DOCUMENTS

| | | | |
|---|---|---|---|
| 10,589,738 B1 * | 3/2020 | Boecker | B60W 30/02 |
| 2019/0168724 A1 * | 6/2019 | VandenBerg, III | B60T 8/171 |
| 2022/0289156 A1 * | 9/2022 | Lee | B60T 8/329 |
| 2022/0289162 A1 * | 9/2022 | Lee | B60T 13/686 |
| 2023/0415717 A1 * | 12/2023 | Kim | B60T 13/58 |

* cited by examiner

*Primary Examiner* — Phutthiwat Wongwian
*Assistant Examiner* — Arnold Castro
(74) *Attorney, Agent, or Firm* — EIP US LLP

(57) ABSTRACT

Brake force distribution during an anti-lock braking (ABS) event in a vehicle using an electronic parking brake (EPB) force to supplement a primary brake pressure is described. In an example, an vehicle control system of the vehicle can detect when an ABS event is going to occur and a primary brake pressure can be applied to a rotor at a wheel of the vehicle using a primary brake system. An EPB brake pressure can be applied to the rotor using an EPB brake system to reduce the pressure required to be applied by the primary brake pressure. As a result, the primary brake system may be sized to accommodate normal braking and to accommodate ABS braking when supplemented by the EPB system.

20 Claims, 10 Drawing Sheets

APPARATUS AND METHOD FOR ELECTRICALLY ASSISTED HYDRAULIC BRAKE

BACKGROUND

Vehicles may experience anti-lock braking (ABS) events when having to suddenly stop in an emergency. In an ABS event, the vehicle may prevent one or more wheels from locking during braking so that the vehicle may stop quickly while maintaining directional control. ABS system may cycle braking pressure on each brake rotors of the vehicle to reduce the associated wheel speed while preventing the wheel from locking and the tire of the wheel from losing traction.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
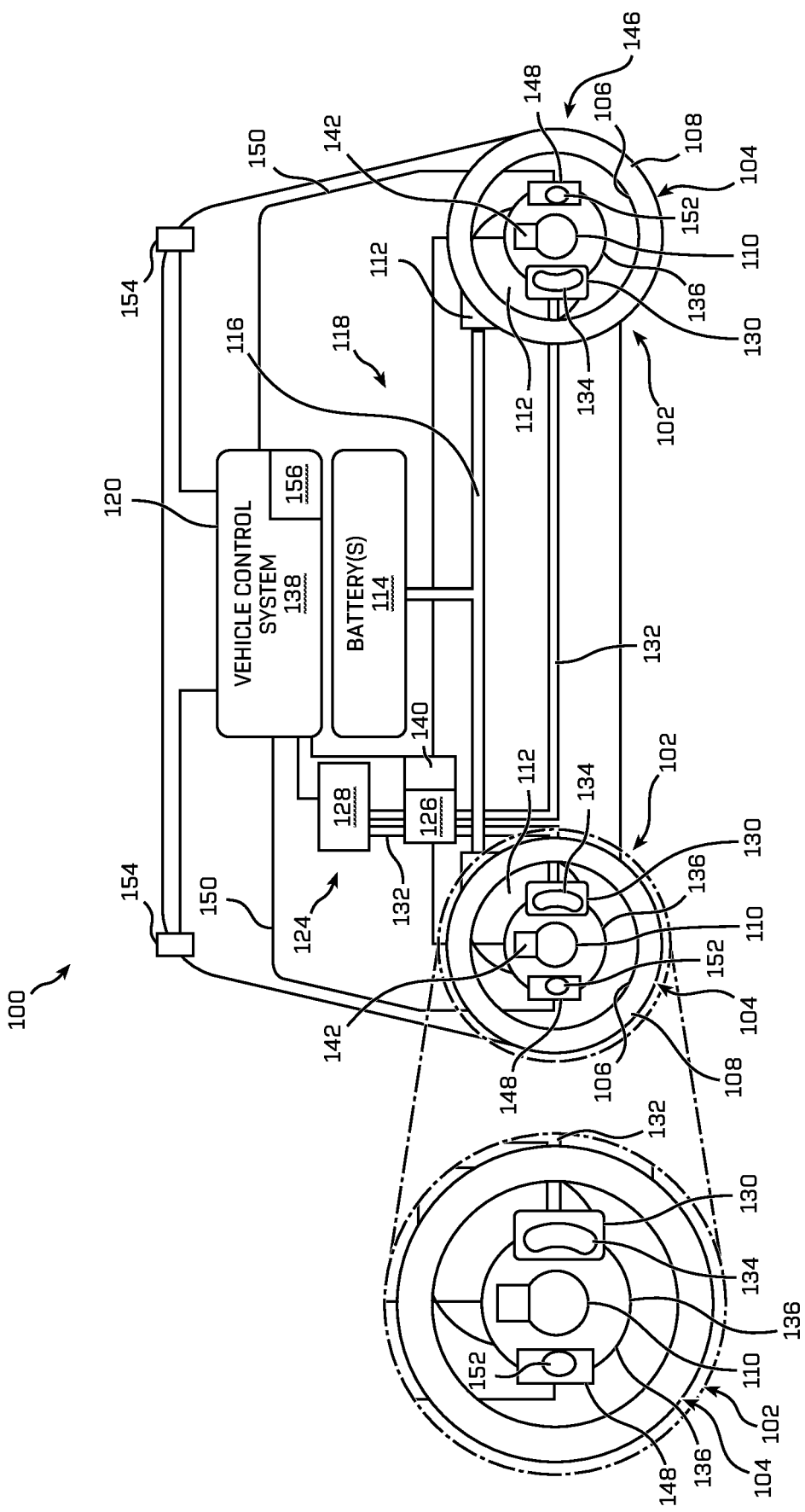
FIG. 1 is a schematic view of an example vehicle as described herein.

Techniques described relate to braking systems for vehicles and may have particular application in autonomous vehicles (AV) and vehicles having electronic stability control (ESC). In at least one example, techniques described herein involve utilizing an electronic parking brake (EPB) system during an anti-lock brake (ABS) event to reduce maximum braking pressure requirements of a primary hydraulic brake system. An ABS event may be a situation in which the ABS of the vehicle is activated to cycle or modulate a braking pressure (e.g., via hydraulic pressure at one or more wheel brake cylinders or calipers) to apply a variable braking pressure to prevent the associated wheel from locking and/or remaining locked by allowing the wheel to rotate and regain traction with the ground (or prevent the loss of traction). In some examples, the vehicle may be a hybrid or fully electric vehicle and a regenerative braking system may be used in addition to the EPB system and hydraulic brake system.

Electric vehicles (EV) using batteries and electric motors for motive force may be heavier than a corresponding vehicle powered by a combustion engine. Autonomous vehicles and robotaxis, in particular, may be heavier because of the computing system, associated cooling, and the various sensor systems used by these vehicles. This extra weight means that the vehicle has a higher kinetic energy when moving and therefore must have a brake system that is capable of counteracting the weight to bring the vehicle to a stop in an ABS event within a required distance. In an example, the brake system may be capable of providing enough braking torque to lock or almost lock the wheels while the vehicle is moving. Braking torque may involve brake pad friction coefficient, mass of vehicle, size of rotor and pad, brake system pressure, etc.).

One conventional approach is to increase the size of the primary brake system. The primary brake system is the main brake system that is used to stop the vehicle and, in many examples, the primary brake system is hydraulic. However, increasing the size or braking capacity of the hydraulic brake system can involve increasing the size of the brake components at each of the wheels assemblies and may include increasing the size of the rotors, calipers and/or brake pads. Increasing the size of the brake components at the wheel assemblies can cause a corresponding increase in the weight of the brake components and may require other components, such as the wheels and tires, to be enlarged to accommodate the larger rotor size. Increasing the weight of the brake components at the wheel assemblies also increases the overall weight of the vehicle can decrease the energy efficiency of the vehicle.

While a relatively smaller hydraulic brake system may be used with an EV, the hydraulic pressure required to counteract the vehicle weight may be higher than is ideal for the hydraulic system. In some instances, a typical hydraulic brake pressure required to lock a wheel for a non EV vehicle may be between 80 and 120 bar, but the same sized system on a heavier EV may reach around 180 bar to lock one of the wheels. Reaching this higher pressure can take longer and can result in longer braking distances. The higher pressure may also negatively impact the fatigue life and performance of the ABS module over time.

A hydraulic disc brake system may include a hydraulic master cylinder, and hydraulic brake components at each wheel assembly. The wheel assembly brake components may include a brake caliper (that includes one or more pistons), brake pads and a brake rotor. Each wheel assembly may include a wheel that includes a rim and a tire, and the rotor may be attached to rotate with the wheel. The master cylinder may provide pressure to a hydraulic fluid that in turn provides pressure to the brake caliper piston(s) which cause the brake pads to apply a clamping pressure to the brake rotor to resist rotation of the rotor and the wheel. In some vehicles, the master cylinder may be controlled by an ECU to apply the brakes to slow the vehicle.

A brake actuation system may include an ABS ECU that receives wheel speed signals from a wheel speed sensor at one or more wheel assemblies. The ABS ECU may compare the wheel speed at each monitored wheel to determine if one or more wheels are rotating slower than another wheel or is about to stop rotating or has stopped rotating (e.g., while the other wheels are still rotating). When one or more wheels lock during braking, the braking distance may be longer than if the wheels do not lock, and the vehicle may experience loss or reduced directional control. In a wheel locking event, the ABS can control the hydraulic pressure to the slower wheel(s) to cycle the pressure so that the wheel(s) does not lock. The ABS may cycle the pressure many times per second, in some examples 15-20 times per second. To avoid wheel lockup the hydraulic pressure at each wheel assembly may be controlled by one or more solenoid valve. The solenoid valves can be electrically operated and may be controlled using the ECU which may be part of the ABS or may be part of an overall vehicle control system. The hydraulic pressure at each wheel assembly may be controlled to tend toward locking the wheel by providing enough pressure to the wheel assembly to lock the wheel, to hold the pressure at the wheel assembly to maintain a certain hydraulic pressure at the wheel assembly, and to release some or all of the hydraulic pressure at the wheel assembly so that the wheel may reduce the braking pressure and may continue to rotate or may increase in rotational speed.

In some examples, vehicles may include an EPB which may be used for static brake applications to hold the vehicle stationary when parked. The EPB system may include an ECU and an EPB system brake at one or more wheel assemblies of the vehicle. In some examples, each wheel assembly may include an EPB system brake, while in other examples, not every wheel assembly includes an EPB system brake. In some examples the EPB system may include an EPB system brake at a vehicle axle or driveshaft. The EPB ECU may provide electronic control signals to each EPB system brake to control the EPB system brake(s). The EPB system brake may each include an electric motor and a piston that is controlled by the motor. In some examples, the EPB system brake may include a caliper and brake pads and may be mounted at the wheel assembly so that the brake pads may provide an EPB clamping pressure to the same rotor used by the hydraulic brake system. In some example, the EPB system brake may be arranged with the hydraulic system caliper so that the electric motor may control the EPB piston to apply pressure to the hydraulic system brake pad. The motor may move the EPB piston to apply the EPB clamping pressure, through the EPB brake pads or hydraulic system brake pads, on the rotor and to release the EPB clamping pressure from the rotor. In some examples, the EPB system brake may include gears and a threaded rod to convert the rotational motion of the motor to linear motion of the EPB piston. A typical EPB system brake has a delay between the time when controls signal the EPB to apply the EPB system brake and the time when the EPB system brake begins to apply the EPB clamping pressure to the rotor. In some examples, part or all of this delay may result from the time it takes the motor to move the EPB piston using the gears and threaded rod. Similar delays are not typically found in hydraulic brake systems.

Example systems and methods are described below in the context of vehicles, including AVs and vehicles having ESC and Advanced driver-assistance systems (ADAS). ADASs are used in vehicles to assist drivers in detecting safety related issues around the vehicle. However, the techniques of the present disclosure are not so limited and may equally be used for other technologies.

FIG. 1 is a schematic view of an example vehicle 100 that may be an autonomous vehicle configured to operate according to a Level 5 classification defined by the U.S. National Highway Traffic Safety Administration. This classification describes a vehicle capable of performing all safety-critical functions for an entire trip, without occupants of the vehicle being required to control the vehicle at any time. In other examples, the vehicle 100 may a non-autonomous vehicle, or a fully or partially autonomous vehicle having a different level of classification. Vehicle 100 is an example of a vehicle employing electrically assisted hydraulic brake functions described herein.

Vehicle 100 may include two or more wheel assemblies 102 which may each include a wheel 104, having a rim 106 and a tire 108, that are rotatable around a hub 110 to move the vehicle 100. The vehicle 100 may be a passenger vehicle, van, sport utility vehicle, crossover vehicle, truck, buss, agricultural vehicle, construction vehicle, and/or other type of vehicle. The vehicle 100 may be powered by one or more internal combustion engines, electric motors powered by one or more power supplies, such as batteries, fuel cells, etc. or a combination of any of these.

Vehicle 100 shown in FIG. 1 may be an electric vehicle (EV) and may include one or more drive module 112, which may include one or more motor at the wheel assemblies 102, to provide a drive force to one or more wheel 104. In some examples, each wheel assembly 102 may include a drive module 112, and in some examples the drive module may drive more than one wheel 104. The vehicle 100 may include one or more battery 114 which may be rechargeable and may include electrical buses 116 which carry electrical current from the battery(s) 114 to the drive module(s) 112 to power the motor(s). The drive module(s) may be connected to the wheels 104 to allow the vehicle 100 to accelerate. The battery(s) 114 may provide the current directly to the drive module(s) 112 through the buses 116, or may provide the current through other components.

The battery 114, the drive module 112, or motor, buses 116 and other components related to controlling and powering the wheels 104, may be considered as a power system 118.

In some examples, the vehicle 100 may include an alternating current (AC) arrangement to power the drive module(s) 112 and may include a variable frequency drive (not shown) or other component to control the speed of the drive module(s) 112. In some examples, the drive module(s) may include a direct current (DC) arrangement and power from the battery(s) 114 may be transferred to the drive module(s) 112 without conversion. In some examples, the vehicle 100 may include regenerative braking which may include using the drive module(s) 112 as generators to decelerate the vehicle 100 and to charge the battery(s) 114 or other use the generated current in another way.

The vehicle 100 may include a vehicle control system 120. In some examples the vehicle control system 120 may be used for controlling the drive module(s) 112 and the regenerative braking. The vehicle control system 120 may include electronic stability control 138 which may be used to control torque, acceleration and/or braking to each wheel 104 of the vehicle 100, and may be used for controlling vehicle steering and other parameters to control the stability of the vehicle 100.

The vehicle may include a primary brake system, such as hydraulic braking system 124 which may include ABS 126. The braking system 124 may include a master cylinder 128, one or more calipers 130, brake lines 132, brake pads 134 and one or more rotors 136. A caliper 130, brake pads 134, and brake rotor 136 for each wheel 104 may be considered as part of the associated wheel assembly 102. The master cylinder 128 may apply a pressure to hydraulic brake fluid (not shown) in one or more of the brake lines 132 which may be transferred to one or more of the calipers 130 at the wheel assembly(s) 102. The calipers 130 apply the pressure from the brake lines 132 to the brake pads 134 to apply a clamping pressure to the rotor 136 which applies a braking force to the vehicle 100 by slowing the rotational movement of the rotor 136 and the associated wheel 104.

The ABS 126 may include a control unit 140 which may include hydraulic controls, solenoid valves, a pump, an accumulator and/or other components as are known in ABS. The control unit may include an ECU for electrical control of the solenoids and/or other components, or the ABS may be controlled by the vehicle control system 120 or control of the ABS may be handled by an ECU in the control unit 140 and in the vehicle control system 120. The ABS 126 may include a wheel speed sensor 142 at each wheel assembly 102. The wheel speed sensor 142 senses the speed of the associated wheel 104 and a signal from the wheel speed sensor 142 is used by the ABS 126 to determine if the wheel 104 is going to lock. When the ABS determines that the wheel is going to lock, then the ABS 126 modulates the hydraulic pressure to the wheel to cycle the clamping pressure at the caliper 130 between a relatively lower pressure and a relatively higher pressure.

The vehicle 100 may include an EPB system 146 which may be controlled by an ECU and/or by the vehicle control system 120. The EPB system 146 may include EPB calipers 148 at each wheel assembly 102 and may be controlled through control cables 150. In some examples, the EPB system 146 may use the EPB calipers 148 to provide an EPB clamping pressure to the rotors 136. In some examples, the EPB system 146 may be controlled to apply the EPB clamping pressure to the rotors 136 when the vehicle 100 is stationary to prevent the vehicle 100 from moving, for example while passengers are loading and unloading. While the EPB calipers 148 are shown separately from the hydraulic system calipers 130, in some examples the EPB calipers 148 may be incorporated into or form part of the hydraulic system calipers 130. In some examples, the EPB system 146 may apply the EPB clamping pressure to the rotor 136 using the hydraulic system brake pads 134. In some examples, the EPB calipers 148 are separate from the hydraulic system calipers 130 and may include EPB brake pads 152 that apply the EPB clamping pressure to the rotor 136 when the EPB system 146 is activated.

Each wheel assembly 102 may include the wheel 104, hub 110 and drive module 112. The wheel assembly 102 may also include wheel assembly brake components including the brake rotor 136, hydraulic caliper 130, the brake pads 134, the EPB caliper 148, and the EPB brake pads 152.

In some examples, the primary braking system 124 may be controlled by the vehicle control system 120. The vehicle control system 120 may control when the braking system 124 engages and how much braking torque the braking system 124 applies. In some examples, the vehicle 100 may include one or more sensors 154 which may involve determining distances between the vehicle 100 and objects in the environment surrounding the vehicle 100. The vehicle 100 may include one or more sensor systems which may be located at the corners, front, back, sides, and/or top of the vehicle 100. In some examples, the sensors may be included in a Lidar system, in some examples, the sensor 154 may be in communication and/or controlled by the vehicle control system 120. The sensors 154 may be used to determine when the vehicle 100 needs to stop and how quickly the vehicle 100 needs to stop. In some examples, the vehicle control system 120 may determine that the vehicle 100 needs to stop within a distance that will require the ABS to cycle. In some examples, the sensor(s) 154 may include sensors used for detecting features of an environment of the vehicle, such as a temperature in the environment around the vehicle 100 which may include the surrounding air, or a road surface temperature. These detected features may be used in determining a scenario in which an ABS event is going to occur and brake pressure required to lock the wheel. In an example, if the road surface temperature or air temperature is at or below freezing then the ABS system may not need to provide as high a pressure to lock the wheels since the tires may have less traction then they would on a warm day with dry roads. In some examples, the vehicle control system 120 may determine that the hydraulic brake pressure required to lock one or more wheel may not exceed a threshold level, such as 120 bar, and may not activate the EPB system 146; one such example is when the road surface is slick.

In some examples, the vehicle 100 may include ESC 138, such as in the vehicle control system 120. The ESC may keep track of individual wheel speed, the position of the steering and acceleration/deceleration. The ESC may include control for the ABS 126 and traction control among other vehicle parameters.

In some examples, the vehicle control system 120 may receive signals from the one or more sensors 154 indicating that an object is in the path of the vehicle 100. The vehicle control system 120 may determine that in order to avoid collision with the object the vehicle 100 must stop within a certain distance and that stopping within that distance will require the activation of the ABS 126. The vehicle control system 120 may also determine that in order for the vehicle 100 to stop within that certain distance the brakes must be applied to the extent that the ABS 126 must be activated to prevent one or more of the wheels 104 from locking and remaining locked. In some examples, the vehicle control system 120 may utilize an estimate or calculation of a time to which a collision may occur, which may be based at least in part on the trajectory and velocity of the vehicle 100 and the object. In some examples, the vehicle control system 120 may utilize electronic stability control 138 to control the braking, trajectory and/or other vehicle parameters in the ABS event.

In some examples, vehicle 100 may include a collision predictor 156. The collision predictor 156 may utilize data representing the object that may be on a collision course with the vehicle 100. The collision predictor 156 may utilize data representing the type of the object and/or the trajectory of the object. The collision predictor 156 may also use data representing a trajectory of the vehicle 100 and environmental conditions. The vehicle 100 may include one or more environment sensors for sensing environmental conditions in the environment surrounding the vehicle 100, such as air temperature, ground temperature, air pressure, humidity, barometric pressure. Data generated by the environment sensors may be used to determine conditions of the road surface upon which the vehicle 100 is traveling. The collision predictor 156 may utilize the data to avoid a collision, to minimize a collision, (e.g., to reduce the impact), or to prepare the vehicle 100 for the impact of the collision. In some examples, the collision predictor 156 may determine that the vehicle 100 needs to apply the brakes to the extent that the ABS 126 must be activated. This determination that an ABS event is going to occur may result from the utilization of data which may include the data related to the object, the environment, and/or the trajectory of the vehicle 100, for example.

Figure 2:
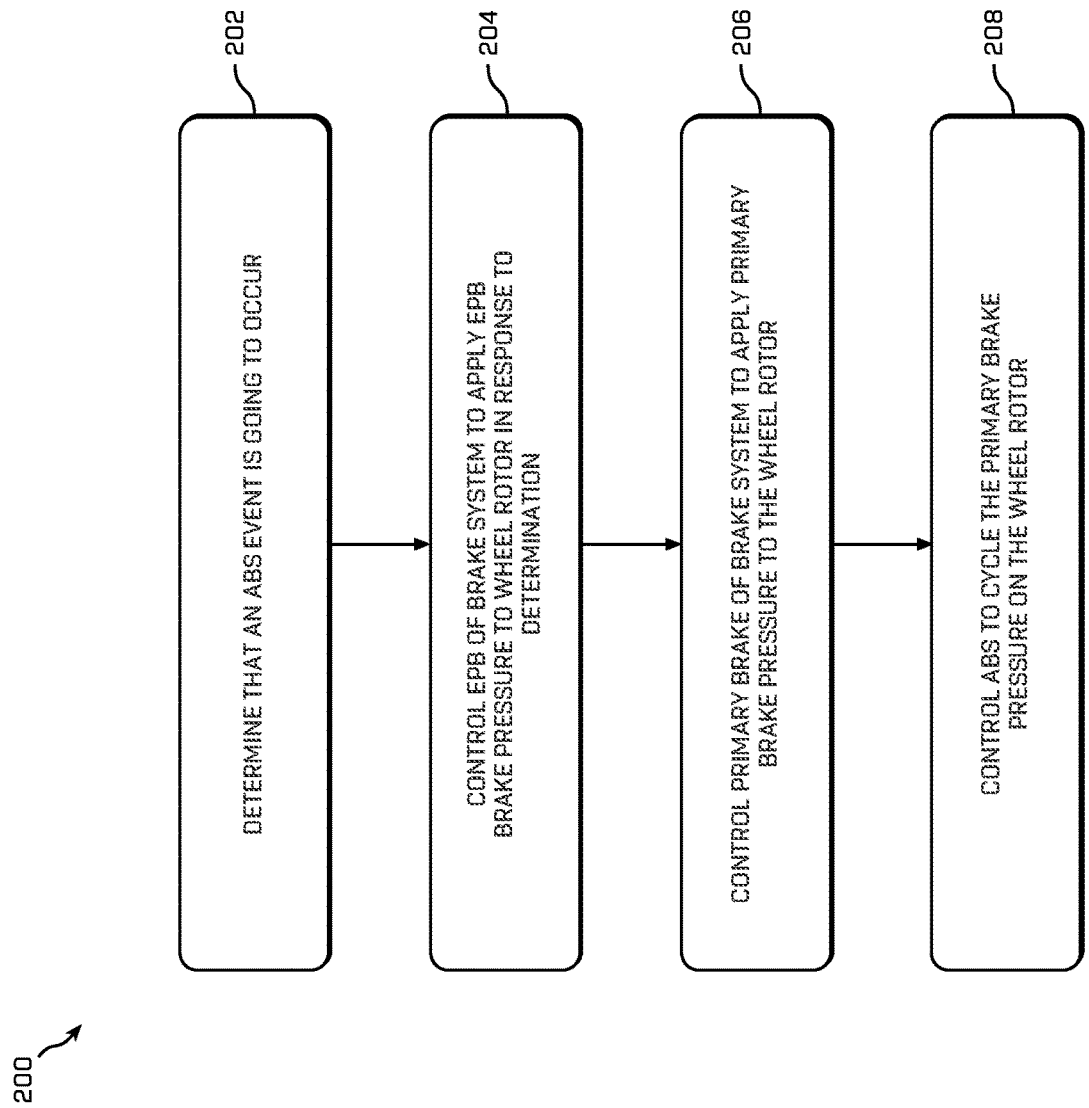
FIG. 2 is a flowchart illustrating an example method for implementing brake pressure controls described herein.

FIG. 2 is a flowchart illustrating an example method 200 for implementing electrically assisted hydraulic brake functions in a vehicle, such as vehicle 100. Method 200 begins at an operation 202 in which the vehicle 100 may determine that an ABS event is going to occur, the ABS event may be the application of brake system clamping forces to a wheel rotor 136 to the extent that the ABS 126 cycles. At operation 204 the EPB system 146 is controlled to apply an EPB clamping pressure to the wheel rotor 136 in response to the determination that the ABS event may occur, and prior to the ABS 126 cycling.

Figure 3:
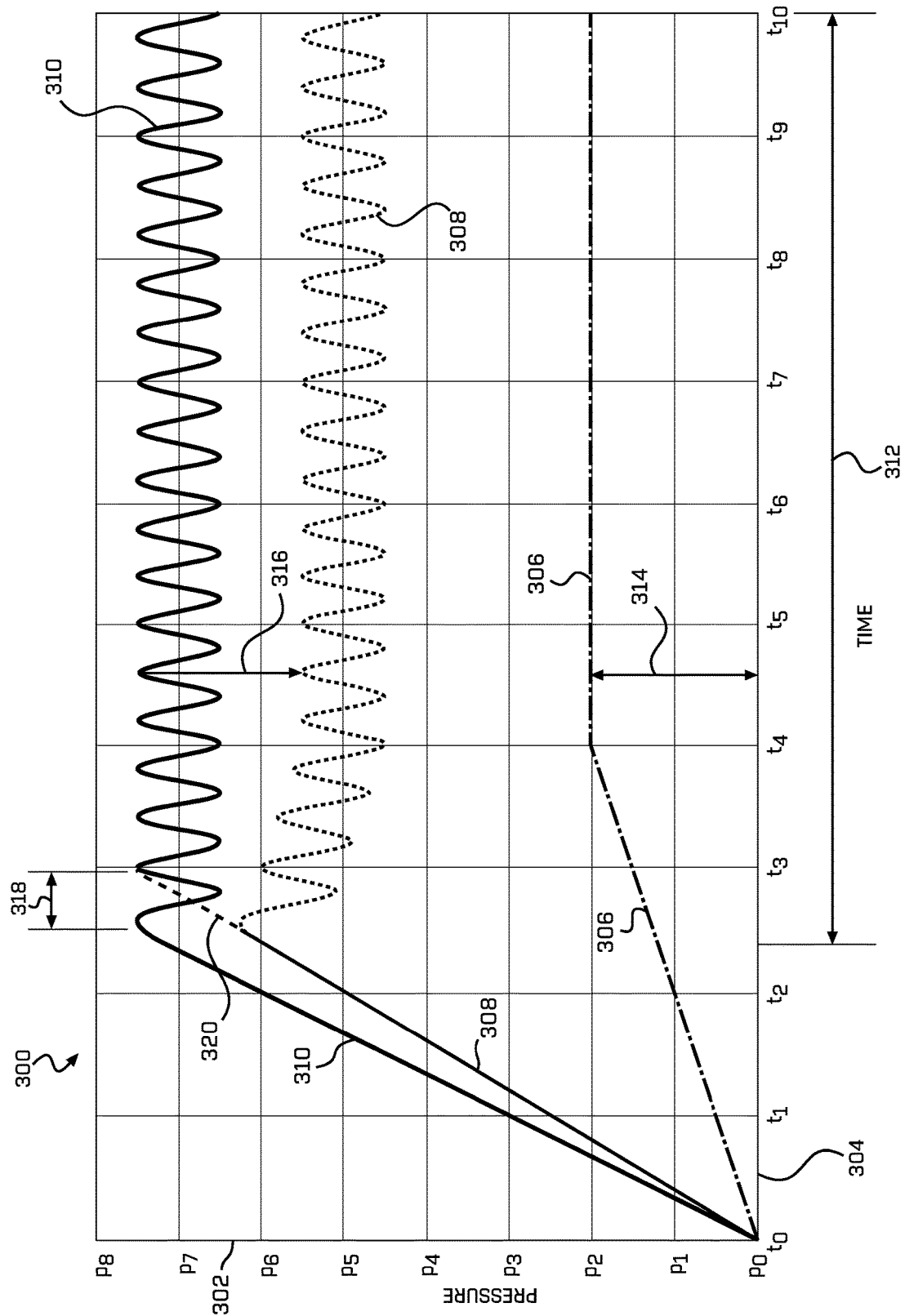
FIG. 3 is a plot showing braking system pressures and time, including during an ABS event.

In the example shown in FIG. 3, the EPB clamping pressure is shown by EPB brake system pressure 304 which begins at zero bar at time zero and increases up to about 40 bar at time t1. In some examples, the EPB system 146 may apply a clamping pressure that is less than 40 bar such as when the road surface is slick and the primary brake system is able to achieve locking pressure with the EPB system 146 applying lower levels of additional pressure to the caliper.

At operation 206 the hydraulic brake system 124 is controlled to apply a hydraulic clamping pressure to the wheel rotor 136. In the example shown in FIG. 3, the primary brake system clamping pressure is shown by hydraulic system pressure 306 which begins at zero and increases to approximately 110 bar at time t2. The hydraulic system pressure 306 is an example, a regenerative braking system may apply a torque to slow the wheel and may be similar or equivalent to the torque provided by the hydraulic system pressure 306 or braking system may include the regenerative braking along with the hydraulic system.

FIG. 3 shows a plot 300 of brake system pressure 302 (p0 to p8) plotted against time 304 (t0 to t10). The plot 300 shows an EPB brake system pressure 306 (which may be pressure applied by the EPB brake pad 152 to the rotor 136), a primary system braking pressure 308 (which may be pressure applied by the brake pad 134 to the rotor 136), and a net braking system pressure 310, which may be a summation of the EPB pressure 306 and primary system braking pressure 308. In the example shown in FIG. 3, an ABS event 312 occurs from a time between time t2 and t3 until time t10 while the primary brake system pressure 308 cycles. The cycling of the primary system braking pressure 308 causes the net braking system pressure 310 to cycle. The plot 300 illustrates an offset, represented by offset arrows 314 and 316 that use of the EPB brake system provides.

As shown in FIG. 3, the net braking system pressure 310 may be the hydraulic system pressure combined with the EPB brake system pressure 306. In some examples, the net braking system pressure 310 provides a sufficient clamping force to the wheel rotor 136 to begin to lock the wheel 104. At operation 208, (FIG. 2) the ABS 126 is controlled to cycle the primary brake system pressure 308 which causes a cycling of the net braking system pressure 310 at the wheel rotor 136.

In some examples, the net braking system pressure 310 may be greater than the pressure p6, (which may be 120 bar), to begin to lock the wheel 104 and to begin the ABS event. In some examples, the primary system pressure 308 may be between pressure p4 and p6 (80 bar and 120 bar) to begin the ABS event. In some examples, the hydraulic system pressure may cycle between approximately 90 bar and 110 bar, or may cycle around p5, which may be 100 bar.

In some examples, the EPB braking system pressure 306 may be less than p4 (which may be 80 bar), and in some examples, regenerative braking using one or more motor in the drive module 112 may be used to reduce the net braking system pressure required to begin the ABS cycling. In some examples, the EPB system 146 may begin to apply an EPB clamping pressure to the rotor 136 before the ABS 126 begins to cycle. In some examples the EPB clamping pressure is a first braking pressure that may be applied in anticipation of an ABS event. In some examples, the hydraulic brake system may begin to apply the hydraulic clamping force to the wheel rotor 136 before the EPB system begins to apply the EPB clamping force to the rotor. As shown in FIG. 3, the hydraulic or primary system pressure 308 may increase faster than the EPB brake system pressure 306 in some examples.

In some examples, such as shown in FIG. 3, the EPB braking system pressure 306 ramps up to full pressure p2, which may be about 40 bar, from time t0 to time t4. The EPB brake system may be slower to get to full pressure than the primary brake system. In the example shown in FIG. 3, the net braking system pressure 310 cycles between a pressure greater than p7 and a pressure less than p7 during the ABS event 312. To reach the net braking system pressure quickly, the primary braking system pressure 308 rises to over p6 while the EPB braking system pressure 306 is still ramping up. The primary braking system pressure 308 then decreases to cycle between pressure greater and less than p5 as the EPB braking system pressure ramps up to pressure p2. By having the primary braking system pressure temporarily overshoot the cycling pressure while the EPB braking system pressure is still ramping up, the net braking system pressure can reach the p7 pressure for ABS wheel control quickly without the primary braking system pressure 308 having to provide the full pressure of the net braking system.

In some examples, the rotor 136 and/or caliper 130 of the hydraulic brake system 124 may be sized such that the net braking system pressure 308 is larger than would typically be found in a brake system that only has hydraulic brakes. For example, the rotor 136 and/or caliper 130 may be relatively smaller than those same components in a system that has only hydraulic brakes. However, in the electrically assisted hydraulic brake functions described herein, the hydraulic brake system pressure 306 is offset, as indicated by the offset arrows 314 and 316, by the EPB system 146 providing the additional EPB clamping force (e.g., EPB brake system pressure 304) to reach the net braking system pressure 308 for activating the ABS 126.

As shown in FIG. 3, by using the EPB brake system pressure 306 in addition to the primary brake system pressure 308, the net braking system pressure 310 may be able to reach the pressure needed by the primary brake system to lock the front wheel, or begin ABS cycling sooner than the primary brake system pressure 308 alone, as represented by the time period 318. Dashed line 320 represents the continued slope of the increasing primary brake system pressure without the offset provided by the EPB brake system pressure 306.

Figure 4:
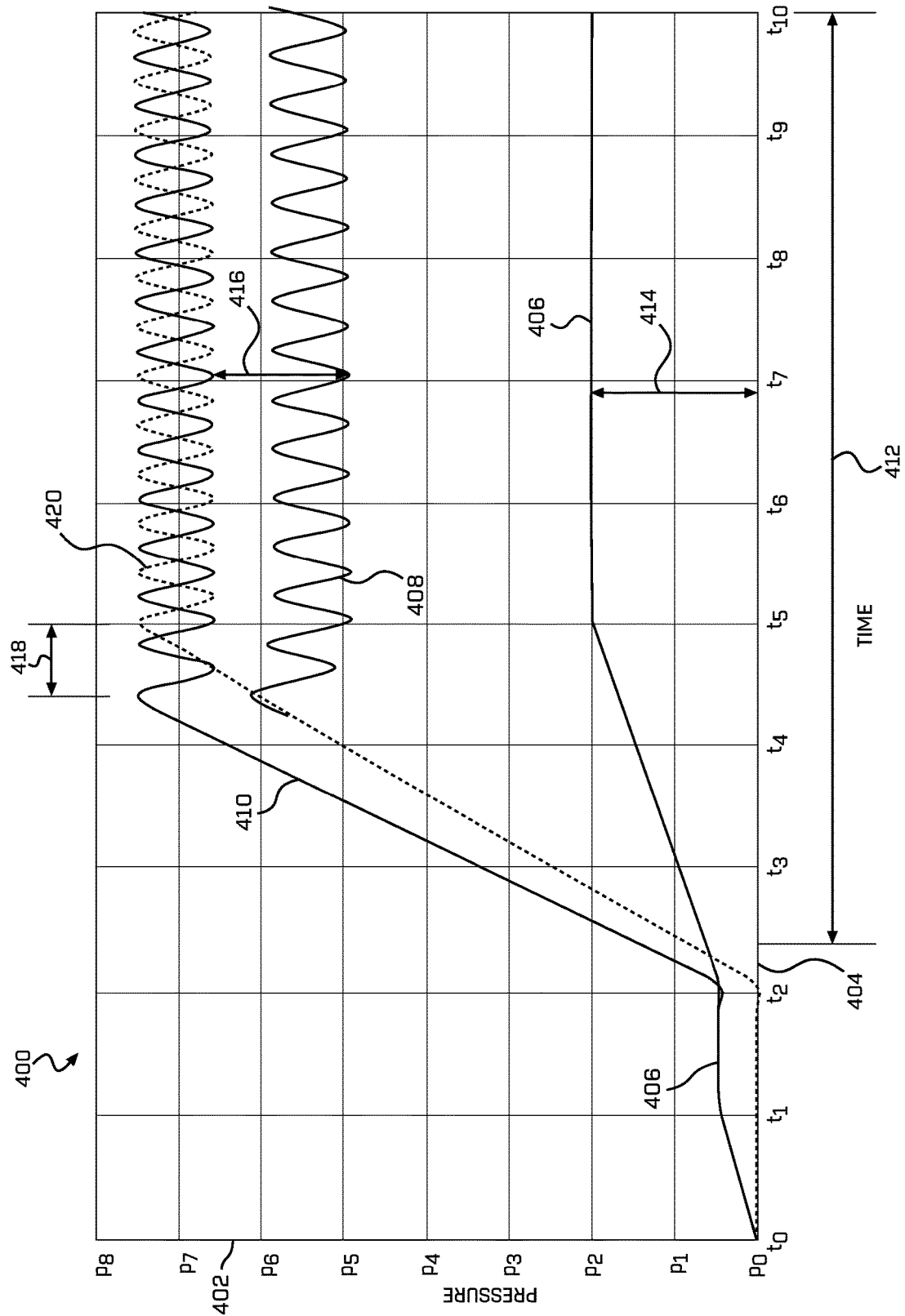
FIG. 4 is a plot showing braking system pressures and time when an electronic parking brake pressure is applied prior to application of a primary brake system pressure.

FIG. 4 shows a plot 400 of brake system pressure 402 (p0 to p8) plotted against time 404 (t0 to t10). The plot 400 shows an EPB brake system pressure 406 (which may be pressure applied by the EPB brake pad 152 to the rotor 136), a primary system braking pressure 408 (which may be pressure applied by the brake pad 134 to the rotor 136), and a net braking system pressure 410, which may be a summation of the EPB pressure 406 and primary system braking pressure 408. In the example shown in FIG. 4, an ABS event 412 occurs from a time between time t4 and t5 until time t10 while the primary brake system pressure 408 cycles. The cycling of the primary system braking pressure 408 causes the net braking system pressure 410 to cycle. The plot 400 illustrates an offset, represented by offset arrows 414 and 416 that use of the EPB brake system provides.

As shown in FIG. 4, by using the EPB brake system pressure 406 in addition to the primary brake system pressure 408, the net braking system pressure 410 may be able to reach the pressure needed by the primary brake system to lock the front wheel, or begin ABS cycling sooner than the primary brake system pressure 408 alone, as represented by the time period 418. Dashed line 420 represents the continued slope of the increasing primary brake system pressure without the offset provided by the EPB brake system pressure 406.

In some examples, the EPB brake system 146 may apply the EPB brake system pressure 406 (as shown between times t0 and t2) prior to the application of the primary brake system pressure 410, which is shown to start at about time t2. As shown in FIG. 4, the pre-application of the EPB brake system pressure 406 may be at a lower pressure (shown between P0 and P1) than the EPB brake system pressure 406 used during the ABS event 412, and which may provide the offset(s) 414/416.

Figure 5:
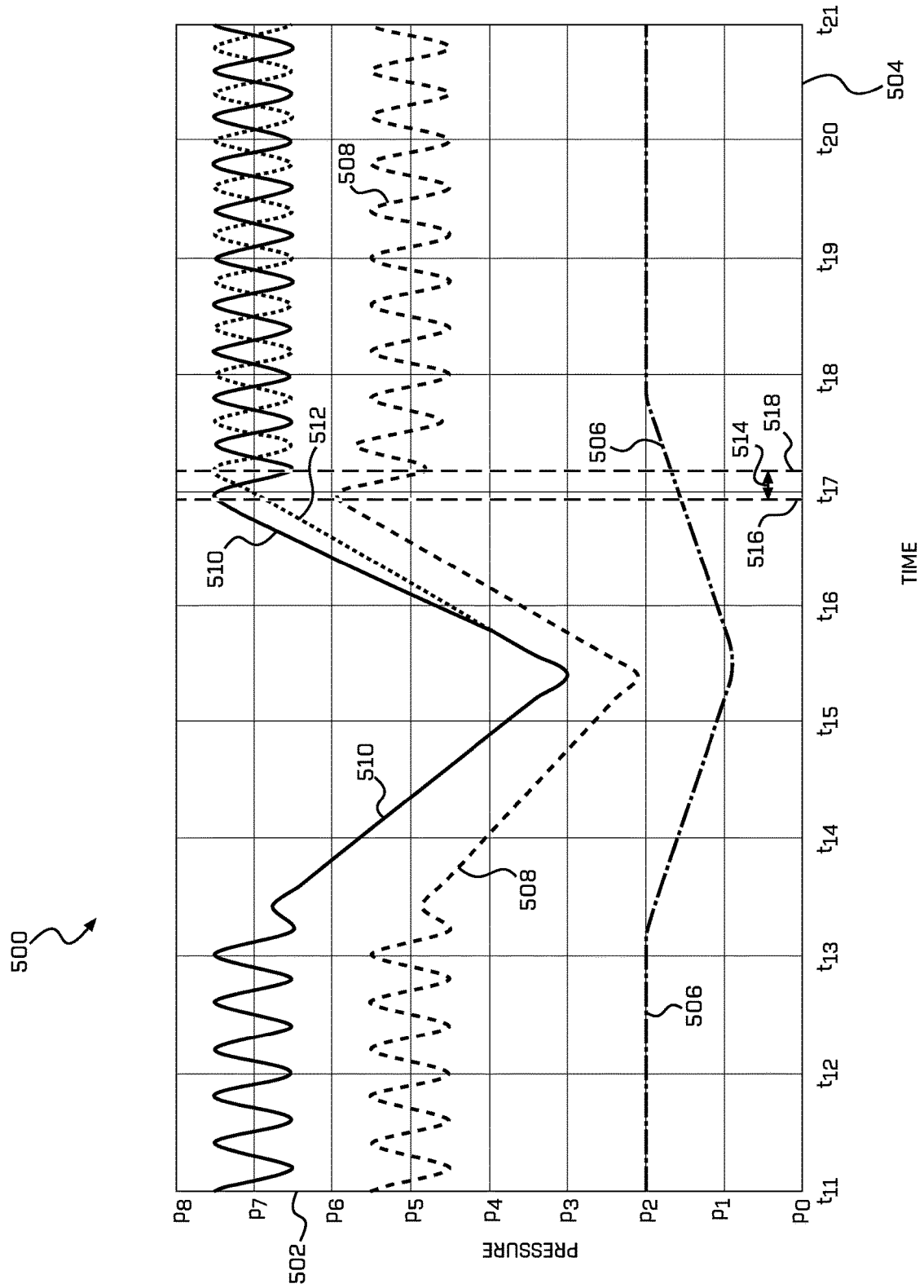
FIG. 5 is a plot showing braking system pressures and time during an ABS event, partial release of the brake and re-engagement of ABS.

FIG. 5 shows a plot 500 of brake system pressure 502 (p0 to p8) plotted against time 504 (t11 to t21). The plot 500 shows an EPB brake system pressure 506, a primary system braking pressure 508, and a net braking system pressure 510, which may be a summation of the EPB pressure 506 and primary system braking pressure 508. In the example shown in FIG. 5, an ABS event stops at approximately time t13 and begins again at approximately time t17. In between time t13 and t17 the ABS system stops cycling the brake pressure. The brake pressures decrease from just after time t13 until between times t15 and t16 and then increase again until approximately time t17 for the primary brake system pressure 508 and net braking system pressure 510 and until just before time t18 for the EPB brake system pressure 506.

As shown in FIG. 5, net braking system pressure 510 may be able to re-apply the brake pressures to reach the ABS event pressures and begin to cycle faster using the EPB brake system pressure 506 in addition to the primary system braking pressure 508 alone. In the example shown in FIG. 5, the dashed line 512 represents the re-application of the primary brake system pressure 508 without the additional pressure provided by the EPB brake system pressure 506 ramping back up. Arrow 514 represents the difference between a time 516 in which the net braking system pressure 510 reaches the pressure needed to begin ABS operation when the EPB brake system pressure 506 is used, and a time 518 in which the net braking system pressure 510 reaches the pressure needed to begin ABS operation when the EPB brake system pressure 506 is not used.

Figure 6:
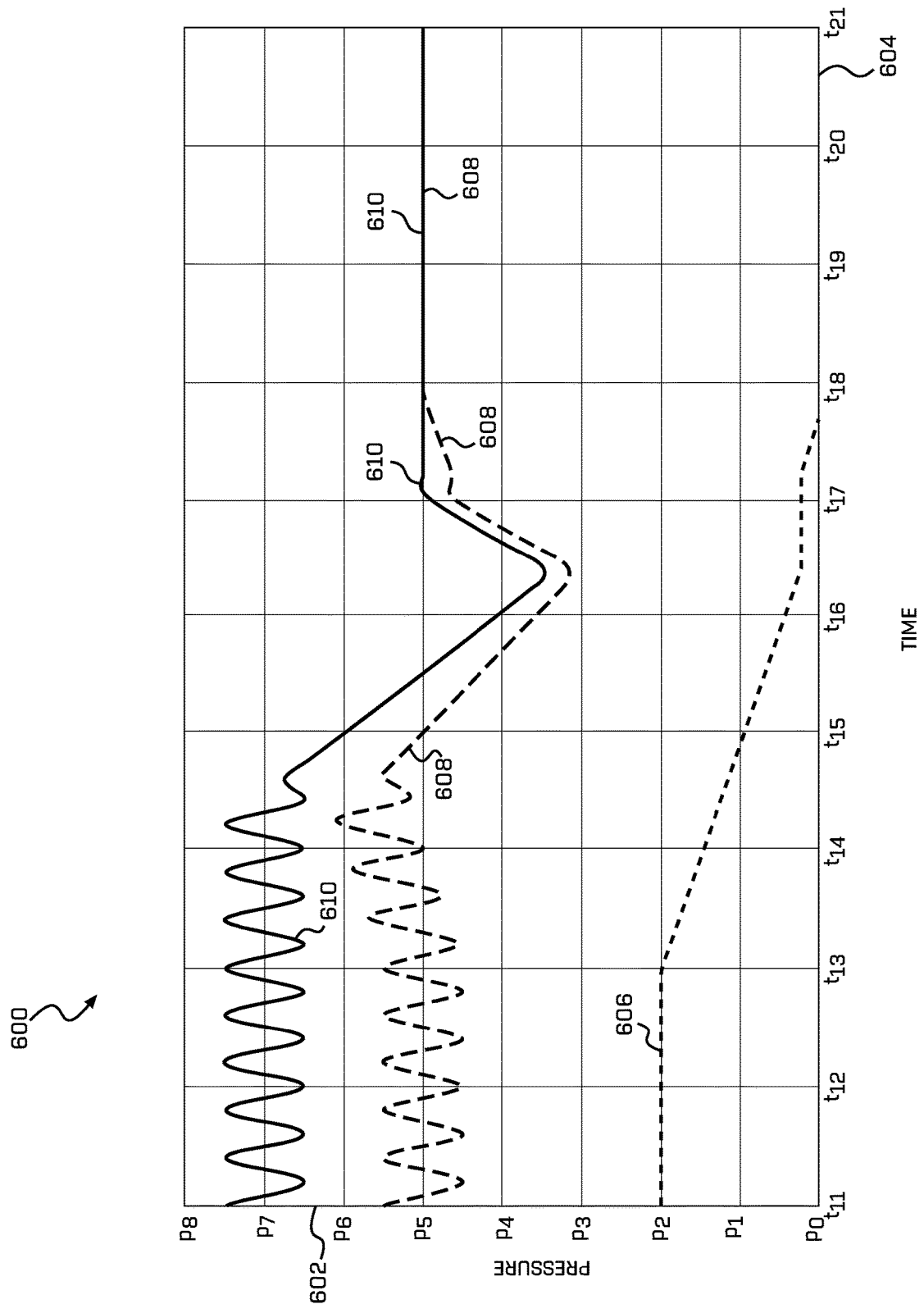
FIG. 6 is a plot showing braking system pressures and time during an ABS event, partial release of the brake and re-engagement of the brake without ABS.

FIG. 6 shows a plot 600 of brake system pressure 602 (p0 to p8) plotted against time 604 (t11 to t21). The plot 600 shows an EPB brake system pressure 606, a primary system braking pressure 608, and a net braking system pressure 610, which may be a summation of the EPB pressure 606 and primary system braking pressure 608. FIG. 6 illustrates an example in which the brakes of the vehicle are applied to an extent that the ABS operates, the brakes are then partially released and then re-applied to an extent that the ABS does not operate. In some examples, the EPB brake system pressure 606 may be released and the brakes re-applied so that only the primary system braking pressure 608 is used. Such an example is shown in FIG. 6 at approximately time t13 through t21.

In the example shown in FIG. 6, an ABS event stops at approximately time t14. In between time t14 and t15 the ABS system stops cycling the brake pressure. At approximately time t13 the EPB brake begins to decrease the EPB brake system pressure 606 and the pressure 606 decreases until between time t16 and t18 at which time it levels off at less than P1, the EPB brake system pressure 606 then decreases to P0. In the example shown in FIG. 6 the primary brake system pressure 608 initially increases from between time t13 to after time t14 to maintain the net braking system pressure 610 while the EPB brake system pressure 606 decreases. When the brakes are partially released, the primary brake system pressure 608 and net brake system pressure 610 decrease until between time t16 and t17 and between pressures P3 and P4. When the brakes are re-applied the EPB brake system pressure 606 remains constant and the primary brake system pressure 608 and net brake system pressure 610 increase rapidly to a constant pressure of about P5.

Figure 7:
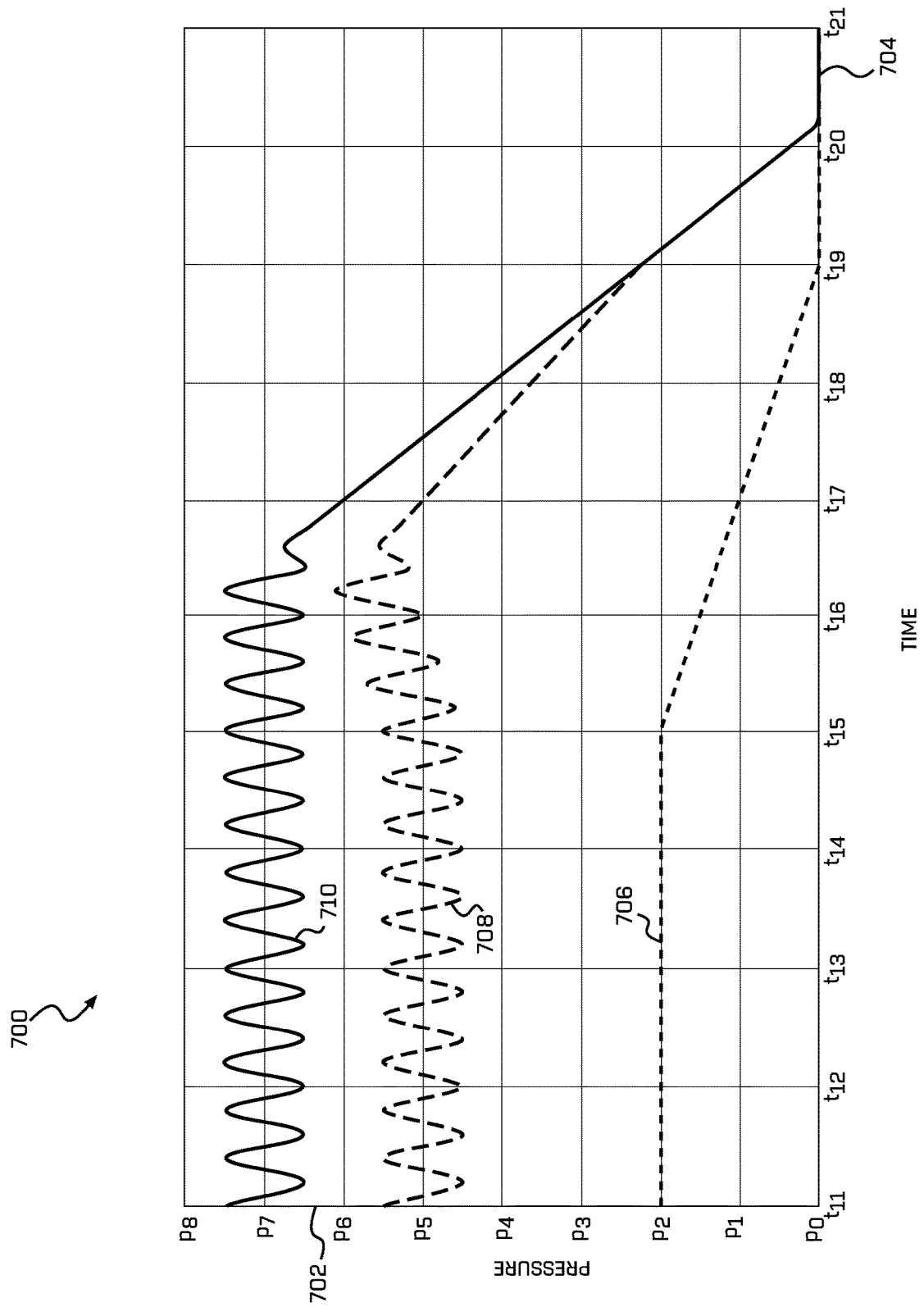
FIG. 7 is a plot showing braking system pressures and time during a discontinuation of an ABS event.

FIG. 7 shows a plot 700 of brake system pressure 702 (p0 to p8) plotted against time 704 (t11 to t21). The plot 700 shows an EPB brake system pressure 706, a primary system braking pressure 708, and a net braking system pressure 710, which may be a summation of the EPB pressure 706 and primary system braking pressure 708. In the example shown in FIG. 7, an ABS event stops between approximately time t16 and t17. The collision predictor 156 (FIG. 1) may predict that the ABS system will no longer be needed and the EPB brake system pressure 706 may begin to taper off at a time t15 before then. As the EPB brake system pressure 706 tapers off, the primary system braking pressure 706 may temporarily increase to maintain the net braking system pressure 710 at the pressure needed to cycle the brake pressure at a sufficient pressure to lock and unlock the brake rotor and associated wheel.

Figure 8:
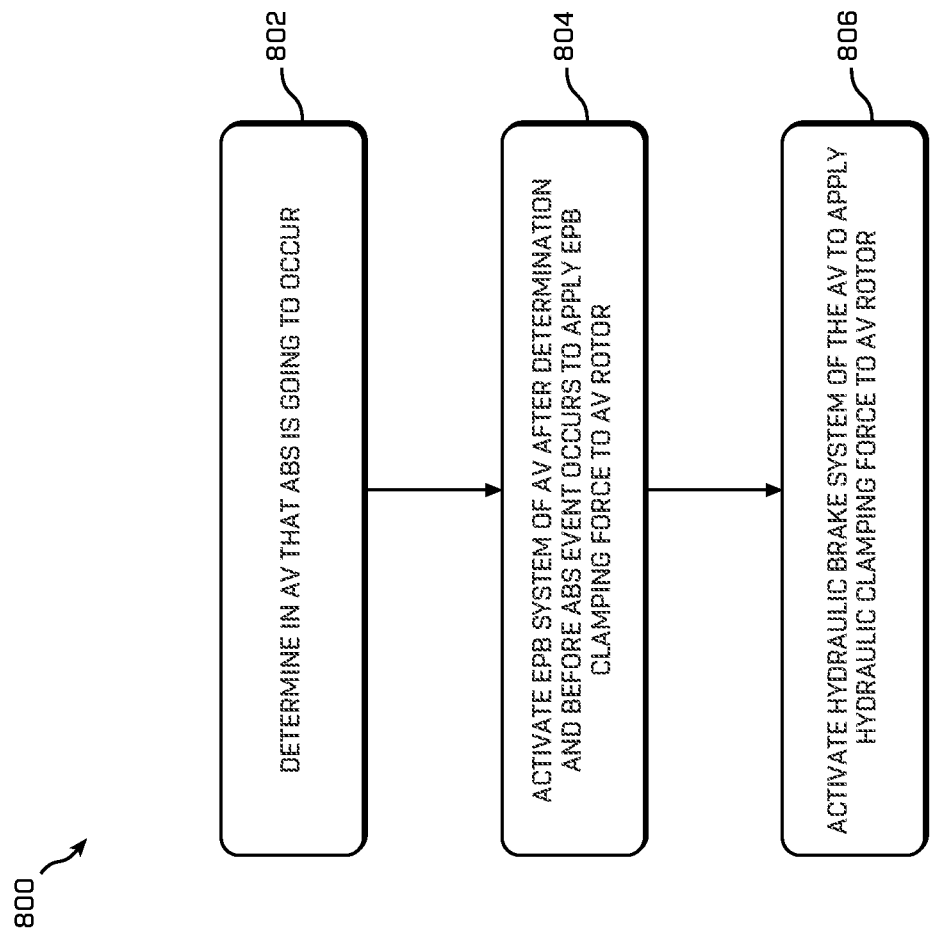
FIG. 8 is a flowchart illustrating another example method for implementing brake pressure controls described herein.

FIG. 8 is a flowchart illustrating another example method 800 for implementing electrically assisted hydraulic brake functions in a vehicle, such as vehicle 100. Method 800 begins at an operation 802 in which a determination that an ABS event is going to occur in an autonomous vehicle, which may be vehicle 100. At operation 804 the EPB system 146 of the autonomous vehicle may be activated after the determination that the ABS event is going to occur. The activation of the EPB system may include causing an EPB clamping force to be applied to a brake rotor, such as brake rotor 136, of the autonomous vehicle. At operation 806 the primary brake system, such as hydraulic brake system 124, may be activated to apply a primary brake system pressure to the brake rotor 136. Application of the primary brake system pressure and the EPB brake pressure to the brake rotor may cause the ABS 126 to cycle.

In some examples, the electronic parking brake and the primary brake system are activated at essentially the same time. In some examples, the activation can be performed by the vehicle control system 120 which may send signals to activate the electronic parking brake and the primary brake system. In some examples, the EPB system is controlled separately from the primary brake system. In some examples, the EPB system is not used during normal braking operations to slow movement of the vehicle 100 that do not involve an ABS event. In some examples, the electronic parking brake is activated after the vehicle control system 120 determines that the ABS event will require that the primary brake system will need to exceed a threshold pressure. In some examples, that threshold pressure is 120 bar.

Figure 9:
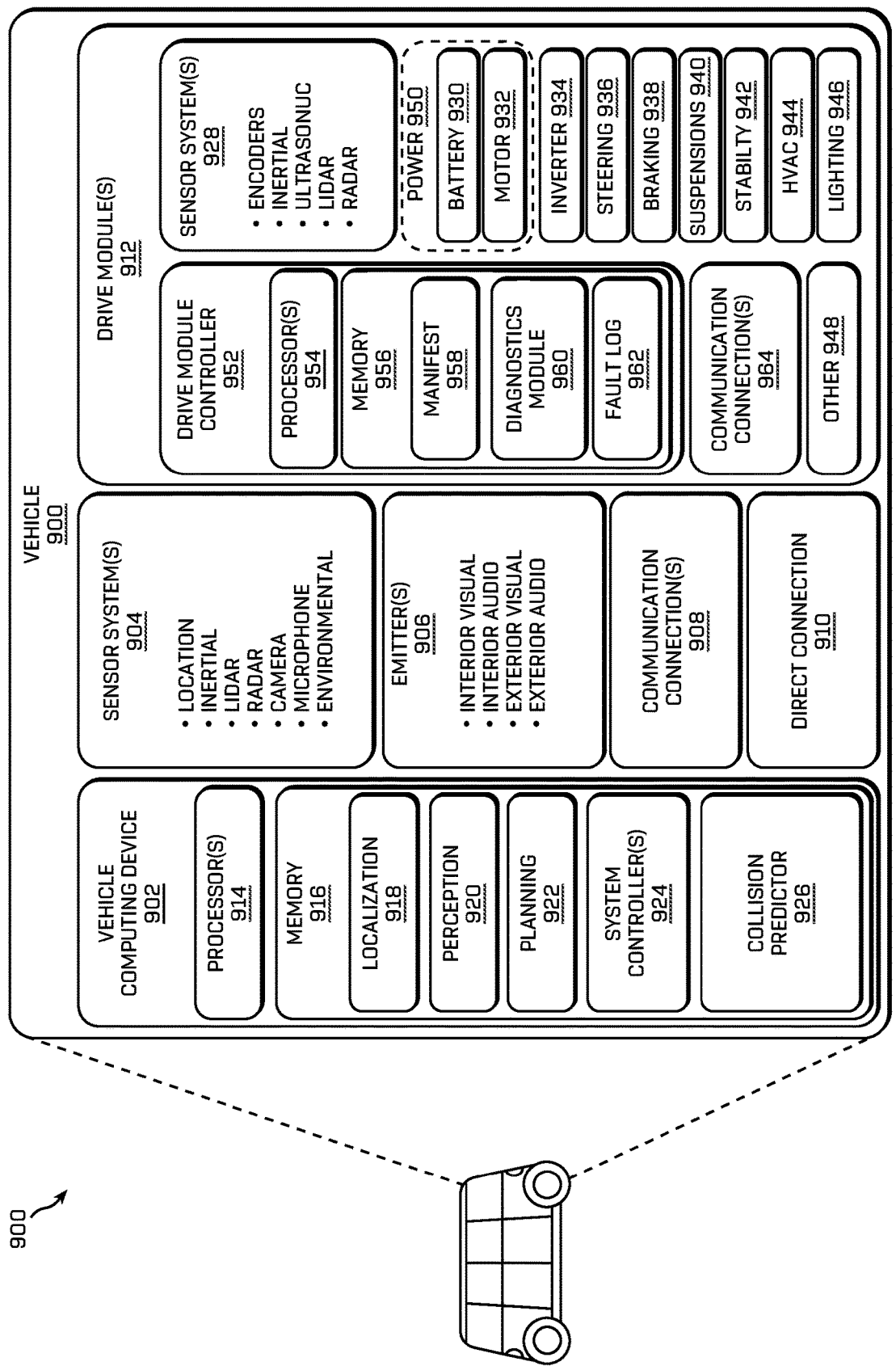
FIG. 9 is a block diagram illustrating an example computing architecture of a vehicle as described herein.

FIG. 9 is a block diagram illustrating an example computing architecture of a vehicle 900 as described herein. In some examples, the vehicle 900 may be the same vehicle as the vehicle 100 described above with reference to FIG. 1. The vehicle 900 may include a vehicle computing device 902, one or more sensor systems 904, one or more emitters 906, one or more communication connections 908, at least one direct connection 910, and one or more drive modules 912.

The vehicle computing device 902 can include one or more processors 914 and memory 916 communicatively coupled with the one or more processors 914. In the illustrated example, the vehicle 900 is an autonomous vehicle, however, the vehicle 900 could be any other type of vehicle. In the illustrated example, the memory 916 of the vehicle computing device 902 stores a localization system 918 to determine where the vehicle 900 is in relation to a local and/or global map, a perception system 920 to perform object detection, segmentation, and/or classification, and a planner system 922 to determine routes and/or trajectories to use to control the vehicle 900.

In at least one example, the vehicle computing device 902 can include one or more system controllers 924, which can be configured to control steering, propulsion, braking, safety, emitters, communication, and other systems of the vehicle 900. These system controller(s) 924 can communicate with and/or control corresponding systems of the drive module(s) 912 and/or other components of the vehicle 900. In at least one example, the vehicle control system 120 described above with reference to FIG. 1 can correspond to the system controller(s) 924. The vehicle computing device 902 may include a collision predictor 926, which may be collision predictor 156 shown in FIG. 1.

In at least one example, the sensor system(s) 904 can include light detection and ranging (LIDAR) sensors, radio detection and ranging (RADAR) sensors, sound navigation and ranging (SONAR) sensors, location sensors (e.g., global positioning system (GPS), compass, etc.), inertial sensors (e.g., inertial measurement units, accelerometers, gyroscopes, etc.), cameras (e.g., RGB, IR, intensity, depth, etc.), microphones, environment sensors (e.g., temperature sensors, humidity sensors, light sensors, pressure sensors, etc.), etc. In at least one example, the sensor system(s) 904 may include one or more of the sensors 154 shown in FIG. 1. The sensor system(s) 904 can include multiple instances of each of these or other types of sensors. For instance, the LIDAR sensors can include individual LIDAR sensors located at the corners, front, back, sides, and/or top of the vehicle 900. As another example, the camera sensors can include multiple cameras disposed at various locations about the exterior and/or interior of the vehicle 900. The sensor system(s) 904 can provide input to the vehicle computing device 902.

The vehicle 900 can also include one or more emitters 906 for emitting light and/or sound, as described above. The emitters 906 in this example include interior audio and visual emitters to communicate with passengers of the vehicle 900. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 906 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 900 can also include one or more communication connection(s) 908 that enable communication between the vehicle 900 and one or more other local or remote computing devices. For instance, the communication connection(s) 908 can facilitate communication with other local computing devices on the vehicle 900 and/or the drive module(s) 912. Also, the communication connection(s) 908 can allow the vehicle to communicate with other nearby computing devices (e.g., other nearby vehicles, traffic signals, etc.). The communications connection(s) 908 also enable the vehicle 900 to communicate with a remote teleoperations computing device or other remote services.

The communications connection(s) 908 can include physical and/or logical interfaces for connecting the vehicle computing device 902 to another computing device or a network. For example, the communications connection(s) 908 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing devices.

In at least one example, electrical, fluid, and/or air connections can be provided between the drive module(s) 912 and other components of the vehicle 900. This can be accomplished via a bypass or direct connection 910 in the vehicle 900 that directly connects the drive module(s) 912 and other components of the vehicle. For example, if the vehicle 900 includes multiple drive modules 912 and a hydraulic brake system, such as hydraulic brake system 124 shown in FIG. 1. The hydraulic brake system of the first drive module can be in direct fluidic communication with a hydraulic brake system of the second drive module via direct connection 910 in order to balance the pressure in the brake systems of both drive module(s) 912. As another example, compressed air from a compressed air system of the first drive module can be directly connected to a compressed air system of the second drive module to balance air pressure of an air suspension system of one or both drive module(s) 912. As yet another example, the direct connection 910 can provide a high voltage link between the batteries of two drive module(s) 912 in order operate the vehicle 900 off the batteries of both drive module(s) 912 to maintain voltage equilibrium between the batteries. While not shown, a switch or valve can be disposed in the direct connection 910 in order selectively close one or more of the direct electrical, fluid, and/or air connections between the drive module(s) 912.

In at least one example, the vehicle 900 can include one or more drive modules 912. In some examples, the vehicle 900 can have a single drive module 912. In other examples, the vehicle 900 can have multiple drive modules 912, which can be identical or different (e.g., one drive module can have a subset of the features of the other drive module, or the drive modules can have one or more distinct or mutually exclusive vehicle systems). In an example where the multiple drive modules 912 are identical (or substantially identical), they can provide the vehicle 900 with redundancy of systems and components (e.g., sensors, battery, inverter, motor, steering, braking, suspension, stability, HVAC, lighting, drive module controller, communication connections, etc.). Thus, if a system of one drive module or a component thereof fails or needs services, in many instances, the vehicle 900 will be able to continue to operate by relying on the corresponding system or component of the other drive module. In at least one example, if the vehicle 900 has multiple drive modules 912, individual drive modules 912 can be positioned on opposite ends of the vehicle 900 (e.g., the front and the rear, etc.).

In the illustrated example, the drive module(s) 912 include one or more sensor systems 928 to detect conditions of the drive module(s) 912 and/or the surroundings of the vehicle 900. By way of example and not limitation, the sensor system(s) 928 can include one or more wheel encoders (e.g., rotary encoders) such as wheel speed sensors 142 shown in FIG. 1, to sense rotation of the wheels of the drive modules, inertial sensors (e.g., inertial measurement units, accelerometers, gyroscopes, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 912. In some cases, the sensor system(s) 928 on the drive modules can overlap or supplement corresponding systems of the vehicle 900 (e.g., sensor system(s) 904). For instance, when present, the LIDAR sensors on the drive module(s) 912 can be in addition to, and can supplement the fields of view of, the LIDAR sensors on the vehicle 900. Other sensors such as the inertial sensors of the drive module(s) 912 can measure the same or similar forces/conditions as the inertial sensors on the vehicle 900 but can measure them from the perspective of the drive module(s) 912. This can, for instance, enable to the drive module(s) 912 to operate and "balance" on their own, even when detached from the vehicle 900. In some examples, such sensor systems 938 can include, but are not limited to, mass airflow sensors, pressure sensors for wheels, battery charge capacity sensors, various microcontrollers capable of outputting diagnostic signals of associated systems or subsystems, and the like.

The drive module(s) 912 in this example include many of the vehicle systems, including a high voltage battery 930, a motor 932 (which can be an electric drive motor) to propel the vehicle, an inverter 934 to convert direct current from the battery into alternating current for use by other vehicle systems, a steering system 936 including a steering motor and steering rack (which can be electric), a brake system 938, a suspension system 940 including hydraulic and/or pneumatic components, an HVAC system 944, lighting 946 (e.g., lighting such as head/tail lights to illuminate an exterior surrounding of the vehicle), and one or more other systems 948 (e.g., cooling system, safety systems, onboard charging system, other electrical components such as a DC/DC converter, a high voltage junction, a high voltage cable, charging system, charge port, etc.).

In some examples, the drive module(s) 912 may include electronic stability control (ESC) 942, an example of which is electronic stability control 138. The electronic stability control 942 can determine when to apply different force(s) to different wheels (e.g., via different wheel assemblies 102) of the vehicle 900 to vary the distribution of brake forces. In some examples, the electronic stability control 942 can utilize regenerative braking techniques to affect a negative force on one or more first wheel assembly 102. In some examples where regenerative braking techniques are employed, some of the electrical energy is deposited into the battery or another component). In at least one example, the electronic stability control 942 can distribute brake forces at any time. In additional and/or alternative examples, the electronic stability control 942 can distribute brake forces responsive to determining an occurrence of an event such as an impending ABS event.

In an example, the electronic stability control 942 can access data associated with wheel speeds of individual wheels of the vehicle 900, such as by using the wheel speed sensors 142 shown in FIG. 1. Based on the data associated with the wheel speeds, the electronic stability control 942 can calculate a relative slip of each of the wheels. Leveraging the determined slip of individual of the wheels, the electronic stability control 942 can determine variations of friction with respect to the surface on which the vehicle 900 is driving. That is, in some examples, a first wheel can be associated with a first wheel speed that is greater than a second wheel speed associated with a second wheel. In such examples, the first wheel can be on a surface having less friction (e.g., a lower friction coefficient) than a surface that the second wheel is on. Additionally, and/or alternatively, individual wheels can have different wear, pressure, etc. which can cause the first wheel to be associated with the first wheel speed that is greater than the second wheel speed associated with the second wheel. Based at least in part on determining a variation in friction with respect to the surface on which the vehicle 900 is driving, or some other uneven distribution of friction, the electronic stability control 942 can determine an occurrence of an event. In at least one example, the electronic stability control 942 can refrain from determining an occurrence of an event until a difference between two or more friction coefficients is greater than a threshold. In such an example, responsive to the difference in friction between two or more surfaces meeting or exceeding a threshold, the electronic stability control 942 can determine an occurrence of an event.

In some examples, the electronic stability control 942 can receive an instruction (e.g., responsive to input from a computing device, a driver, a passenger, a remote operator, etc.) indicating an occurrence of an event, such as an impending ABS event.

The electronic stability control 942 can send an indication to the system controller(s) 924 of the event, which can send command(s) to one or more system(s) of the drive module(s) 912. In at least one example, the electronic stability control 942 can provide an indication of how force(s) are to be distributed between different wheel assemblies 102 of the vehicle 900 to vary the distribution of brake forces. That is, in at least one example, the electronic stability control 942 can determine a magnitude and/or direction of force to be applied at each wheel assembly of the vehicle 900 and can provide an indication of such to the system controller(s) 924.

In at least one example, the brake system 938 can correspond to the primary brake system 124 and EPB system 146, as well as the ABS 126 described above with reference to FIG. 1. Further, in at least one example, one or more of the systems described can comprise a power system 950, which can correspond to the power system 118, described above with reference to FIG. 1. For instance, in at least one example, the battery 930, the motor 932, etc. can be associated with the power system 950.

The drive module(s) 912 can also include a drive module controller 952 to receive and preprocess data from the sensor system(s) 928 and to control operation of the various vehicle systems 930-948. The drive module controller 952 includes one or more processors 954 and memory 956 communicatively coupled with the one or more processors 954. The memory 956 of the drive module(s) 912 can store a manifest 958 including a list or other data structure maintaining an inventory of the components that are included in the respective drive module. In some examples, such an inventory can include batch numbers for various parts, components, systems, or subsystems. In some examples, the manifest 958 can be generated and/or updated automatically by, for example, communication with the individual components/systems, or by sensing or reading one or more machine readable codes associated with the individual components/systems (e.g., by reading a radio frequency ID tag or barcode applied to each component/system). Additionally, or alternatively, some components/systems can be added to the manifest manually by a technician when assembling or servicing the drive module(s) 912.

A diagnostics module 960 can execute on the drive module controller 952 to check systems of the respective drive module(s) 912 to ensure that they are operating within normal operating parameters. The diagnostics module 960 can employ data collected by sensor system(s) 928 of the drive module and/or data from the sensor system(s) 904 or vehicle computing device 902. Any failures or anomalies can be recorded in a fault log 962. The fault log 962 can include an indication of the failure or anomalous measurement detected and an identifier of the component(s)/system (s) involved. The fault log 962 can also store a snapshot of operating conditions leading up to the failure or anomalous measurement. The manifest 958 and the fault log 962 can be stored locally at the drive module(s) 912 and used by service technicians to troubleshoot problems when servicing the drive module(s) 912. Additionally or alternatively, the manifest 958 and/or fault log 962 can be reported to the vehicle computing device 902 (e.g., the electronic stability control 942), an automated service robot, and/or to a remote service (e.g., a teleoperations computing device, an inventory tracking system, etc.). This reporting can occur periodically (e.g., daily, hourly, etc.) or upon the occurrence of certain events (e.g., determination of a fault, detection of a collision, transit to a service location, etc.). In some examples, the manifest 958 and/or fault log 962 (or a subset thereof) can be included in a vehicle heartbeat signal that is periodically transmitted to a remote fleet management system or teleoperations service.

The drive module(s) 912 also include one or more communication connection(s) 964 that enable communication by the respective drive module with one or more other local or remote computing devices. For instance, the communication connection(s) 964 can facilitate communication with other local computing devices on a respective drive module and/or the vehicle 900. Also, the communication connection(s) 964 can allow the drive module(s) 912 to communicate with other nearby computing devices (e.g., detached by proximate body module, an automated services vehicle, a remote-control device, etc.). For instance, the communication connection(s) 964 can enable to the drive module(s) 912 to communicate with other nearby components of the vehicle 900. The communication connection(s) 964 also enable the drive module(s) 912 to communicate with a remote teleoperations computing device or other remote services.

The communication connection(s) 964 include physical and/or logical interfaces for connecting the drive module controller 952 to another computing device or a network. For example, the communication connection(s) 964 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing devices.

The processor(s) 914 of the vehicle 900 and the processor (s) 954 of the drive module(s) 912 can be any suitable processor capable of executing instructions to process data from the sensor system(s) 904 and 928, respectively, and control operation of the vehicle systems. By way of example and not limitation, the processor(s) 914 and 954 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 916 and memory 956 are examples of non-transitory computer-readable media. Memory 916 and memory 956 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 10:
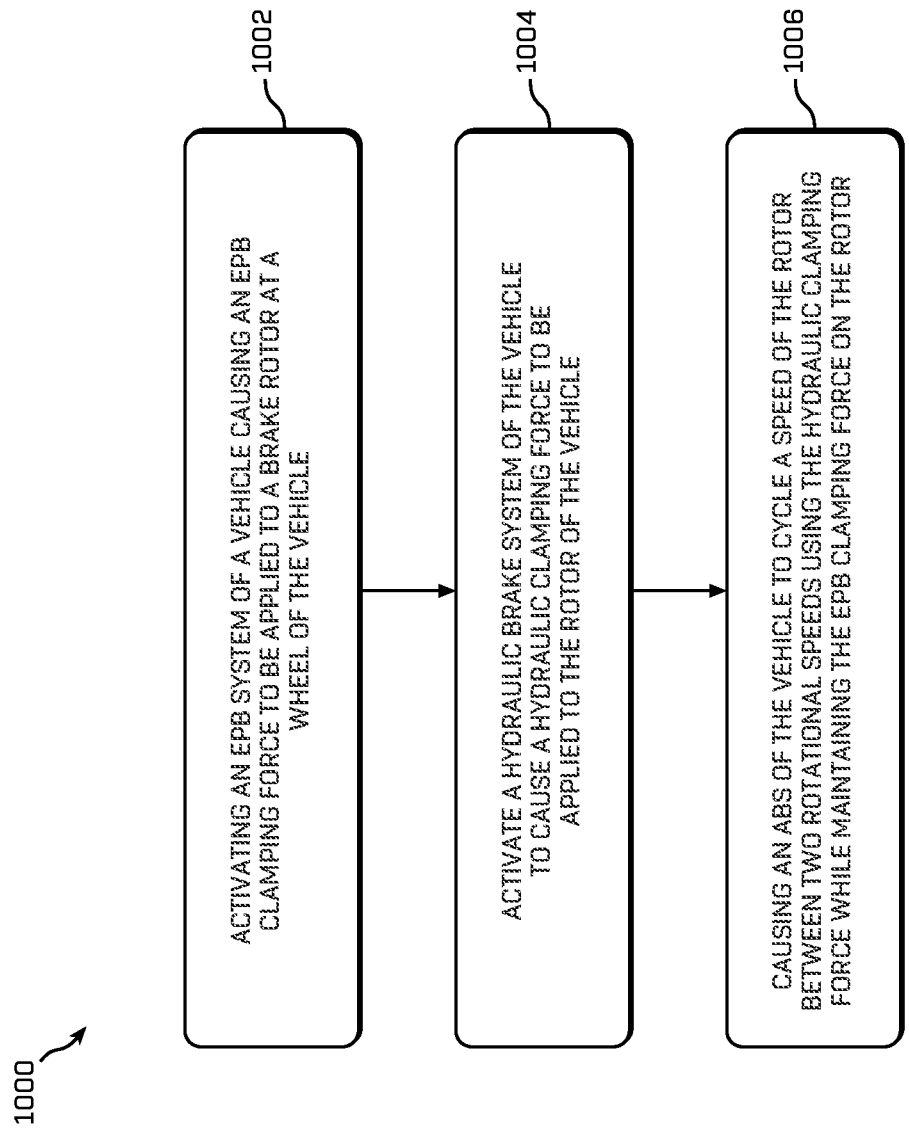
FIG. 10 is a flowchart illustrating another example method for implementing brake pressure controls described herein.

FIG. 10 is a flowchart illustrating another example method 1000 for implementing electrically assisted hydraulic brake functions in a vehicle, such as vehicle 100. Method 1000 may involve a non-transitory computer readable storage medium storing instructions which, when executed by a processing circuitry of a computer perform the method 1000. In some examples, the non-transitory computer readable storage medium may be or may include memory 916 and/or memory 956, and the processing circuitry may be or may include processor(s) 914 and/or processor(s) 954. At an operation 1002 of method 1000, an EPB system, such as EPB system 146 is activated to cause an EPB clamping force to be applied to a brake rotor, such as brake rotor 136 at a wheel of a vehicle, such as vehicle 100. At an operation 1004 of method 1000, a hydraulic brake system, such as hydraulic brake system 124, is activated to apply a hydraulic clamping force to the rotor of the vehicle. At an operation 1006 of the method 1000, an ABS cycles a speed of the rotor between two rotational speeds using the hydraulic clamping force which maintaining the EPB clamping force on the rotor. In an example, a regenerative braking force is also applied to the wheel of the vehicle.

EXAMPLE CLAUSES

A: A vehicle comprising:
   a sensor configured to detect features of an environment of the vehicle;
   a brake system of the vehicle including a primary brake and an electronic parking brake;
   one or more controllers coupled to the sensor and the brake system, the one or more controller configured to:
      determine, based at least in part on the features, a scenario wherein a wheel of the vehicle may lock when braking;
      activate, based at least in part on determining the scenario, the electronic parking brake to apply a first braking pressure in anticipation of the scenario;
      detect an anti-lock brake system (ABS) event; and
      modulate, based on the ABS event, the primary brake to apply a variable braking pressure while the electronic parking brake applies the first braking pressure.

B: The vehicle of clause A, wherein the primary brake is a hydraulic brake system.

C: The vehicle of any of clauses A to B, wherein the primary brake is modulated during application of the electronic parking brake.

D: The vehicle of any of clauses A to C, wherein determining the scenario includes detecting a trajectory of an object that is going to collide with the vehicle.

E: The vehicle of any of clauses A to D, wherein the sensor is configured to detect features of the environment that effects road surface conditions.

F: A method comprising:
determining in an autonomous vehicle (AV) that an anti-lock braking (ABS) event is going to occur;
activating an electronic parking brake (EPB) system of the AV after the determination and before the ABS event occurs, the EPB activation causing a EPB brake pressure to be applied to a brake rotor of the AV;
activating a primary brake system of the AV, the primary brake system activation causing a primary brake to apply a primary brake pressure to be applied to the rotor of the AV, and wherein the combination of at least the EPB brake pressure and the primary brake pressure cause the ABS to cycle.

G: The method of clause F, further comprising activating a regenerative braking system of the AV after the determination, the regenerative braking system activation causing a regenerative braking by using an electric motor of the AV to resist rotation of at least one wheel and wherein the regenerative braking, EPB brake pressure and the primary brake pressure cause the ABS to cycle.

H: The method of any of clauses F to G, wherein the primary brake pressure is between 80 bar and 120 bar.

I: The method of any of clauses F to H, wherein the EPB brake pressure is less than 80 bar.

J: The method of any of clauses F to I, wherein the EPB is activated at essentially the same time that the primary brake system is activated.

K: The method of any of clauses F to J, wherein the EPB system and the primary brake system are controlled separately.

L: The method of any of clauses F to K, wherein the EPB system begins to apply the EPB brake pressure after the primary brake system begins to apply the primary brake pressure.

M: The method of any of clauses F to L, further comprising determining an estimate of the road condition and using that estimate in determining that the ABS event is going to occur.

N: The method of clause M, wherein the estimate of the road condition includes determination of a road surface condition.

O: The method of any of clauses M to N, wherein the estimate of the road condition includes determination of an ambient temperature.

P: The method of any of clauses F to O, wherein the determining that the ABS event is going to occur involves a sensor system that detects an object in the environment of the AV.

Q: The method of any of clauses F to P, wherein the primary brake system is a hydraulic brake system, and the method further comprising determining that the ABS event will require the hydraulic brake system to exceed a threshold pressure before activating the EPB system.

R: The method of clause Q, wherein the threshold pressure is 120 bar.

S: A non-transitory computer readable storage medium storing instructions which, when executed by processing circuitry of a computer, perform a method comprising:
activating an electronic parking brake (EPB) system of a vehicle, the EPB activation causing a EPB brake pressure to be applied to a brake rotor at a wheel of the vehicle;
activating a primary brake system of the vehicle, the primary brake system activation causing a primary brake to apply a primary brake pressure to be applied to the rotor of the vehicle;
causing an anti-lock braking system (ABS) of the vehicle to cycle a speed of the rotor between two rotational speeds using the primary brake pressure while maintaining the EPB brake pressure on the rotor.

T: The non-transitory computer readable storage medium of clause S, further comprising: applying a regenerative braking force at the wheel of the vehicle.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
   a sensor configured to detect features of an environment of the vehicle;
   a brake system of the vehicle including a primary brake and an electronic parking brake;
   one or more controllers coupled to the sensor and the brake system, the one or more controllers configured to:
   determine, based at least in part on the features, a scenario wherein a wheel of the vehicle may lock when braking;
   activate, based at least in part on determining the scenario, the electronic parking brake to apply a first braking pressure in anticipation of the scenario;
   detect an anti-lock brake system (ABS) event; and
   modulate, based on the ABS event, the primary brake to apply a variable braking pressure while the electronic parking brake applies the first braking pressure.

2. The vehicle of claim 1, wherein the primary brake is a hydraulic brake system.

3. The vehicle of claim 1, wherein the primary brake is modulated during application of the electronic parking brake.

4. The vehicle of claim 1, wherein determining the scenario includes detecting a trajectory of an object that is going to collide with the vehicle.

5. The vehicle of claim 1, wherein the sensor is configured to detect features of the environment that effects road surface conditions.

6. A method comprising:
   determining in an autonomous vehicle (AV) that an anti-lock braking (ABS) event is going to occur;
   activating an electronic parking brake (EPB) system of the AV after the determination and before the ABS event occurs, the EPB activation causing a EPB brake pressure to be applied to a brake rotor of the AV; and
   activating a primary brake system of the AV, the primary brake system activation causing a primary brake to apply a primary brake pressure to be applied to the rotor of the AV, and wherein the combination of at least the EPB brake pressure and the primary brake pressure cause the ABS to cycle.

7. The method of claim 6, further comprising activating a regenerative braking system of the AV after the determination, the regenerative braking system activation causing a regenerative braking by using an electric motor of the AV to resist rotation of at least one wheel and wherein the regenerative braking, EPB brake pressure and the primary brake pressure cause the ABS to cycle.

8. The method of claim 6, wherein the primary brake pressure is between 80 bar and 120 bar.

9. The method of claim 8, wherein the EPB brake pressure is less than 80 bar.

10. The method of claim 6, wherein the EPB is activated at essentially the same time that the primary brake system is activated.

11. The method of claim 6, wherein the EPB system and the primary brake system are controlled separately.

12. The method of claim 6, wherein the EPB system begins to apply the EPB brake pressure after the primary brake system begins to apply the primary brake pressure.

13. The method of claim 6, further comprising determining an estimate of the road condition and using that estimate in determining that the ABS event is going to occur.

14. The method of claim 13, wherein the estimate of the road condition includes determination of a road surface condition.

15. The method of claim 13, wherein the estimate of the road condition includes determination of an ambient temperature.

16. The method of claim 6, wherein the determining that the ABS event is going to occur involves a sensor system that detects an object in the environment of the AV.

17. The method of claim 6, wherein the primary brake system is a hydraulic brake system, and the method further comprising determining that the ABS event will require the hydraulic brake system to exceed a threshold pressure before activating the EPB system.

18. The method of claim 17, wherein the threshold pressure is 120 bar.

19. A non-transitory computer readable storage medium storing instructions which, when executed by processing circuitry of a computer, perform a method comprising:
- activating an electronic parking brake (EPB) system of a vehicle, the EPB activation causing a EPB brake pressure to be applied to a brake rotor at a wheel of the vehicle;
- activating a primary brake system of the vehicle, the primary brake system activation causing a primary brake to apply a primary brake pressure to be applied to the rotor of the vehicle; and
- causing an anti-lock braking system (ABS) of the vehicle to cycle a speed of the rotor between two rotational speeds using the primary brake pressure while maintaining the EPB brake pressure on the rotor.

20. The non-transitory computer readable storage medium of claim 19, further comprising:
- applying a regenerative braking force at the wheel of the vehicle.

* * * * *